INVENTOR.
CHARLES W. PERKINS
BY
ATTORNEYS

United States Patent Office 3,335,335
Patented Aug. 8, 1967

3,335,335
SEALED ELECTROLYTIC CAPACITOR WITH INSULATIVE PLUG INTEGRALLY JOINED WITHIN CONTAINER OPENING
Charles W. Perkins, North Bennington, Vt., assignor to Tansitor Electronics, Inc., Bennington, Vt., a corporation of Vermont
Filed Dec. 21, 1962, Ser. No. 246,386
4 Claims. (Cl. 317—230)

ABSTRACT OF THE DISCLOSURE

A capacitor comprising an open-ended container for an electrode-immersed electrolyte the open end of which is closed by a peripherally grooved plug of material chemically non-reactive with the electrolyte, into the groove of which there is disposed a peripheral bead of the container walls, a flexible polymerized silicone resin chemically non-reactive with the electrolyte being expanded into the crevices between the walls of the peripheral groove and the said bead, said resin being integrally and permanently joined to the surface of said plug and the adjacent walls of the container including the bead.

---

The present invention relates to sealed electrolytic capacitors. The invention is particularly related to preventing leakage of capacitors of the type comprising an open-ended container having an electrode or electrodes in an electrolyte, with the open end of the container closed by one or more plugs or bushings, through which a lead or leads to the electrode or electrodes may extend.

The plugs or bushings of these sealed electrolytic capacitors, of course, are constituted of material that is resistant to the action of the electrolyte, which often consists of a mineral acid or other corrosive. In some cases, where the containers have been constituted of metal and the plugs of some resilient material, such as rubber, it has been possible to produce a satisfactory seal by crimping the metal of the container against the rubber of the plug. Such crimping alone, however, has not always been found to be effective, and particularly so in cases where the material of the plug is not very highly resilient. In such cases, there is liability of a leak occurring in the voids between the end walls of the plug and the portions of the corresponding inner walls of the container against which these end walls contact or fit. There is likewise danger of deleterious substances entering the container from the outside through the leak.

An object of the present invention, accordingly, is to improve upon the sealing of capacitors of the above-described character.

An object of the invention is to provide an effective corrosive-proof seal between a plug that is not highly resilient and the inner walls of a capacitor container in which it is disposed.

Other and further objects of the invention will be explained hereinafter and will be particularly pointed out in the appended claims.

With the above objects in view, a feature of the invention resides in the use of an electrolyte-resistant sealing or bonding substance that, though originally applied in liquid form, is capable of becoming solidified into a flexible mass and, during such solidification, of expanding into and thus fill all the voids or crevices between the end walls of the plug or bushing and the corresponding inner walls of the container.

A further feature of the invention, in the case of sealing or bonding substances that are not inherently adherent to the material of the plug, involves an initial treating of the material of the plug in order to render the sealing substance more effectively adherent thereto.

Figure 1:
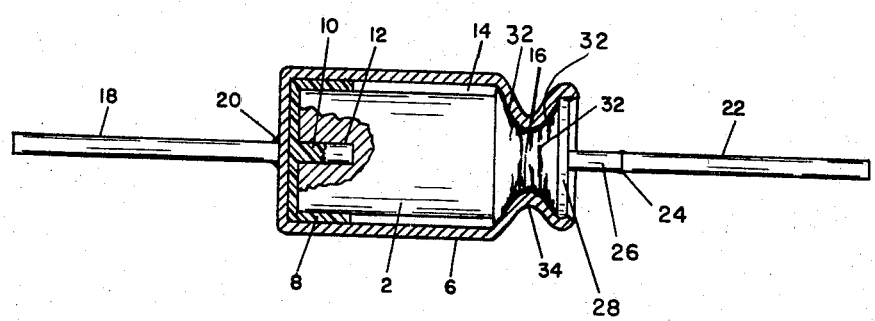
Figure 2:
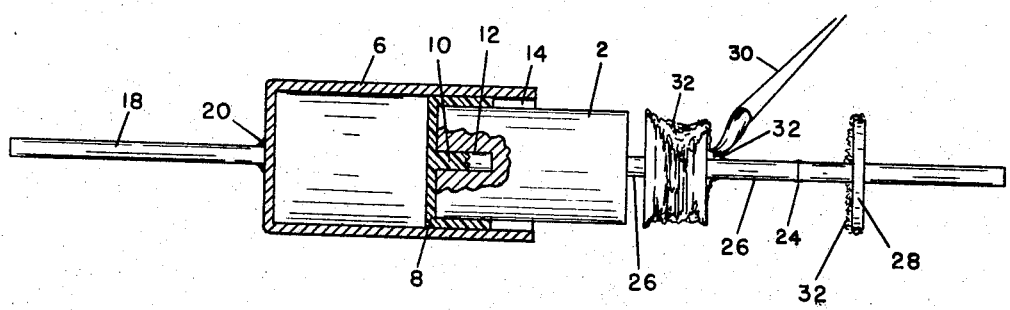
Figures 3, 4:
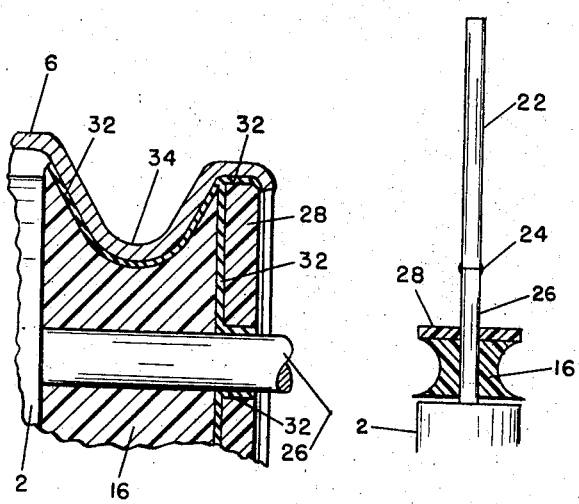

The invention will now be more fully described in connection with the accompanying drawings, in which FIG. 1 is a longitudinal section, partly in elevation, illustrating an electrolytical capacitor embodying the present invention, in preferred form; FIG. 2 is a similar view, with parts of the capacitor separated, prior to assembly, illustrating steps in the manufacture of the capacitor; FIG. 3 is an elevation of the upper part of the anode electrode and adjacent parts, prior to assembly, the plugs or bushings, however, being shown in section and as a unit, separated from the anode electrode; and FIG. 4 is a corresponding fragmentary section, upon a larger scale.

The electrolytic capacitor of the present invention may comprise an inner cylindrically shaped anode electrode 2, immersed in an electrolyte that is contained in a correspondingly cylindrically shaped container 6, which may constitute the outer cathode electrode of the capacitor.

The container 6 may be constituted of any desired material, such as tantalum, aluminum, silver or even, in some cases, a nonmetal, such as a ceramic or a plastic. The anode electrode 2 may be constituted of sintered pressed powder of tantalum or other refractory, corrosion-resistant, chemically inert metal capable of forming on its surface an anodic chemically and electrically stable oxide film. In the case of tantalum, for example, the film may be tantalum pentoxide. Among the metals, in addition to tantalum and aluminum, that may be employed are zirconium, titanium and niobium, as well as their alloys. The powder may be pressed into the shape of a cylinder to provide a porous anode of suitable height and diameter, corresponding to the dimensions of the cathode container 6, as shown. The invention is not, however, restricted to capacitors having anodes of this type. The invention may be embodied also in electrolytic capacitors having anode electrodes of other types, such as those constituted of rolled foil.

The left-hand end of the illustrated anode electrode 2, as viewed in FIGS. 1 and 2, is fitted snugly in a correspondingly cylindrical cup-shaped insulating spacer 8 which, in turn, is of dimensions to fit snugly at the left-hand or bottom end of the cathode container electrode 6, for the purpose of preventing short-circuiting between the anode and cathode electrodes 2 and 6. To facilitate assembly, the insulating spacer 8 may be provided with an integral projection 10 for fitting snugly in a correspondingly shaped longitudinally extending opening 12 of the anode electrode 2. The anode electrode 2 is considerably longer than the length of the insulating spacer 8, thus providing a very narrow space 14 of separation between the anode and cathode electrodes 2 and 6, in which is contained the electrolyte. The electrolyte also, however, permeates the porous anode electrode 2.

The cathode container 6 is shown in FIG. 2 open at its right-hand end, and this open end is shown in FIGS. 1 and 4 closed by an insulating plug or bushing 16. In FIGS. 3 and 4, the insulating plug or bushing 16 is shown provided with a substantially cylindrical end wall or walls, and it is of shape and diameter or other dimensions to fit snugly within the cathode container 6, with its end wall or walls fitting against and in contact with a correspondingly shaped inner wall or walls of the cathode container 6, near its open end.

To avoid circumlocution of language, these end wall or walls of the plug or bushing 16, and these correspondingly shaped inner wall or walls of the cathode container 6 will be referred to as walls, in the plural. The word "substantially" has been employed above, in describing the end walls of the plug or bushing 16, because these end walls are actually shown somewhat concave, defining a peripheral groove. It is preferred to have these end walls somewhat concave in cases where the material of the plug or bushing 16 is of non-resistant material, as hereinafter described, to facilitate the hereinafter-described crimping.

A lead-wire conductor 18 may be soldered, welded or otherwise secured, as shown at 20, to the outer bottom surface wall of the cathode container 6. A lead-wire conductor 22 may similarly, as by means of a weld 24, be joined to an integral riser on projection 26 of the anode electrode 2. The lead-wire conductors 18 and 22 may be constituted of the same metals as the metals of the electrodes 2 and 6 or any other or equivalent metal.

The integral projection 26 of the anode electrode 2 is shown extending through the plug or bushing 16, and also through an additional disc-shaped insulating plug or bushing 28. It serves as a support for these two plugs or bushings 16 and 28, with the plug or bushing 16 in contact with both the plug or bushing 28 and the anode electrode 2. The anode electrode 2, the spacer 8 and the plugs or bushing 16 and 28 may thus be manipulated as a unit for purposes of assembly. In FIG. 2, this unit is shown not quite fully assembled with the cathode container 6. Such assembly is shown completed, however, in FIGS. 1 and 4, it being assumed that the electrolyte has meantime been introduced into the cathode container 6 with the spacer 8 in engagement with the inner bottom surface of the cathode container 6.

In FIGS. 1 and 4, the portions of the walls of the cathode container 6, near its open end, are shown, at 34, crimped into snug tight engagement with, and bearing against, the somewhat concave substantially cylindrical end walls of the plug or bushing 16, producing a peripheral bead in said groove. The crimping may be performed in any desired manner, as with the aid of a roll.

This crimping, as before stated, may or may not provide an effective seal, in cases where the plug 16 is constituted of highly resilient material, such as rubber. It does not, however, by itself, provide an effective seal when the plug 16 is constituted of material that is not sufficiently resilient.

Among the materials that have turned out to be very satisfactory for use as insulating plugs or bushings 16 are polytetrafluoroethylene, marketed under the trademark Teflon, and, sometimes also, polyfluorochlorethylene, marketed under the trademade Kel-F., as well as a combination thereof and similar more or less inflexible halogenated ethylene polymers. Teflon is suitable also for the plugs or bushings 28, though it is preferred to use Kel-F for the spacer 8, and also for the plug or bushing 28, because of its slightly greater resiliency. This slightly greater resiliency is taken advantage of when the extreme right-hand circumferential rim of the cathode container 6 is spun over thereagainst during the crimping operation, as illustrated upon an enlarged scale in FIG. 4.

Since Teflon is not sufficiently resilient, the seals produced by mere crimping, as above described, are not very tight. It is because of this lack of sufficient resiliency of Teflon, moreover, that it is preferred, as before stated, to have the end walls of the plug or bushing 16 somewhat concave. The crimping thereagainst of the before-mentioned correspondingly shaped inner walls of the cathode container 6, near its open end, becomes thereby facilitated.

An understanding of the difficulty of the problem of improving the tightness of these seals may be obtained from the fact that capacitors of the above-described character are designed to operate reliably over a temperature range from −55° C. to +150° C. The interposition of an ordinary sealing filler or other compound in the spaces between the end walls of the plug 16 and the corresponding crimped inner walls of the container against which they contact or fit has been found not to solve the problem over so wide a range of temperatures. In the first place, not all fillers or other such compounds are sufficiently adherent to both the material of the plug 16 and the material of the walls of the cathode container, with the result that parts of the filler or other compound have a tendency to break away. Leakage of the electrolyte or its fumes or vapors will therefore occur at the nonadherent or broken-away spots for this one reason alone. In the second place, those fillers or other compounds that may be more adherent nevertheless frequently develop cracks through which again leaks are produced. In the third place, the material of these fillers and other such compounds becomes rapidly eaten away by the electrolyte in the container. In the fourth place, leaking voids may be produced between the plugs 16 and the crimped inner walls of the container even as a result of the crimping operation itself, as a consequence of the extreme inelasticity of the Teflon; and cracks may be introduced also into the material of the container. Finally, even though all of these obstacles should happen to be overcome at one temperature, they are usually not overcome at other temperatures, particularly since the coefficients of expansion of the material of the cathode container 6 and the material of the insulating plug 16 are so greatly different as to tend to produce cracks, during so great temperature variations. It appears also that actual voids remain in the filler or compound itself through which leaks occur. The above difficulties are especially severe because it is not very easy to find fillers or compounds that will bond or adhere readily to substances such as Teflon. It has heretofore been regarded as impracticable, therefore, to produce effective seals on the surfaces of such substances as Teflon with the aid of ordinary adhesives.

According to the present invention, the substantially cylindrical end walls of the plug or bushing 16, or the before-mentioned correspondingly shaped inner walls of the cathode container 6, near its open end, or both, are first coated or painted with a particular suitable liquid sealant substance. In practice, it is usually sufficient to coat the end walls of the plug or bushing 16 alone, and the description will therefore proceed on that basis, though it will be understood that such description will include within its scope coating also either the inner walls of the cathode container 6 or both these inner walls and the end walls of the plug or bushing 16. This coating step may be effected with the aid of a brush 30, or by spraying, dipping or pouring, or in any other desired manner.

The plug 16, with the liquid coat 32 thereon, is next inserted into the open end of the container 6, as illustrated by FIG. 2, and its said substantially cylindrical end walls are positioned opposite to the said correspondingly shaped inner walls of the cathode container 6. After the electrolyte has been poured into the cathode container 6, the said correspondingly shaped inner walls of the cathode container 6 are then forced or fitted into firm contact or engagement with the said substantially cylindrical end walls in the plug or bushing 16. This may be effected by the before-described crimping. The liquid coating 32 is finally permitted to solidify.

This description would suffice if the only places where the electrolyte or its fumes or vapors could leak out of the container 6 were those between the substantially cylindrical end walls of the plug or bushing 16 and the said correspondingly shaped crimped inner walls of the cathode container 6. The illustrated capacitor, however, is provided also with additional places through which the electrolyte or its fumes or vapors could leak out of the cathode container 6. Those additional places are where the anode-electrode projection 26 extends through the plugs or bushings 16 and 28.

The before-mentioned particular sealant liquid substance is therefore coated or painted, not only at the places above described, but also, as shown in FIG. 2, so as to seal, as well, the spaces in the openings of the anode-electrode riser or projection 26 and the plugs or bushings 16 and 28 through which the anode-electrode riser or projection 26 extends, and including also the outer or right-hand surface of the plug 28. The liquid coating 32 is applied also to the inner or left-hand surface of the plug 28 that is disposed opposite to the said coated outer or right-hand surface of the plug or bushing 16. The coating is thus applied so as to seal all possible spaces through which the electrolyte in the container 6 or its fumes or vapors might otherwise escape.

The coated plug 28 is then pushed into contact with the coated plug 16, and the latter into contact with the anode electrode 2. The unit is then inserted into the cathode container 6, the crimping step is performed, as before described, and the liquid coating is finally solidified. In FIG. 4, the solidified coating 32 is shown in such a way as diagrammatically and by exaggeration to emphasize the fact that all possible voids have been filled by the solidified sealant substance.

The before-mentioned particular sealant liquid coating substance, besides being corrosive-resistant, is of a nature such as to cause it to expand, during its solidification, into all the voids that occur in the spaces betweeen the end walls of the plugs 16 and 28 and the said crimped surfaces of the walls of the cathode container 6. It expands, as well, into the voids that occur also between the anode-electrode projection 26 and the adjacently disposed surfaces of the plugs 16 and 28 of the openings in which the projection 26 is disposed. It expands also even into all the voids that naturally occur in the coated surfaces themselves of the plugs 16 and 28, the said corresponding crimped inner surfaces of the cathode container 6, and the said anode electrode projection 26; therefore the sealing effect may be still further improved by increasing the size of these naturally occurring voids in any desired way, as by etching. In thus solidifying and expanding, the said particular substance becomes converted into a flexible, somewhat rubber-like resilient solid that fills up all the said voids. It is a flexible solidified mass, moreover that remains flexible. On the one hand, it does not solidify too hard, nor, on the other hand, it does not return to the liquid state, throughout the range of temperature over which the capacitor is designed to operate. If the mass should solidify too hard, for example, it would be liable to break during operation over part of this range of temperatures, thus causing leakage; and leakage would equally result if the solidified mass should liquify at some of the operating temperatures.

In effect, therefore, the seal thus produced is self-compensating, in that it adjusts itself to the inherent weaknesses in the spaces between the plugs 16 and 28, the anode-electrode projection 26 and the said crimped inner walls of the cathode container 6. A very effective leak-proof seal is thus provided. Not only has the number of defective capacitors produced during manufacture thus been reduced to negligible proportions moreover, but, also, the capacitors themselves have proved to be of superior quality.

A number of substances have been found to be suitable as sealants in accordance with the present invention. Among these, for example, are silicone resins. A very effective silicone is a polydimethylsiloxane containing functional hydroxyl groups, manufactured by the General Electric Company, Silicone Products Department, Waterford, N.Y., identified as RTV-11. It is also described in Patent 2,457,688 to Krieble and Elliott. The solidification and expansion of this silicone into a flexible mass, after it has been coated, as above described, in liquid form, may be effected through chemical action, by a process of vulcanization. This process promotes cross-linkage and resulting polymerization of the polydimethylsiloxane through the hydroxyl groups, with subsequent hydrolization or liberation of water. The curing may be effected at room temperature, though it may be accelerated by the use of heat. The rate of curing may be controlled also by other factors, such as the kind and quantity of catalyst or curing agent employed. One such catalyst or curing agent is an organic oil identified as Thermolite 12, manufactured by Metal and Thermite Corp., Rahway, New Jersey.

Electrolytes containing dilute solutions of nitric acid have been found to have the least effect on the cured material, while electrolytes containing dilute hydrochloric and sulfuric acids have greater effect. The rate of degradation depends upon the concentration of the acid and the temperature. Increasing the acid concentration and the temperature tends to increase the rate of degradation of the cured material. Organic acids may also be employed as electrolytes; for example, trichloracetic acid. Among non-acid electrolytes that are also usable is lithium chloride. The electrolyte should not, of course, be of such nature as to attack the dielectric film on the film-forming metal of the anode electrode 2.

With an electrolyte containing a 38% solution of sulfuric acid, for example, life tests over a temperature range from $-65$ to $+125°$ C. have shown that the use of the RTV-11 silicone as a sealant will provide a very secure bond to the Teflon of the plug 16 and the Kel F. of the plug 28, and the resulting capacitor will withstand a minimum of 2000 hours at 125° C.

Not the RTV-11 silicone alone, however, but other liquid corrosion-resistant substances may similarly be employed that have the above-described property of expanding and solidifying in response to chemical or physical changes. Among other such substances are Buna N or Hycar, Viton and Butyl.

The theory underlying the effectiveness of the operation underlying the invention is not fully understood, but it is suggested that the solidified sealing substance mechanically interlocks with both the material of the plugs 16 and 28, and the materials of the anode-electrode projection 26 and of the cathode container 6. This interlocking is assumed to be produced by the liquid sealing substance first entering into and then solidifying and expanding into all the voids before mentioned. It may be that at least part of the sealing effect is produced by the mechanical interlocking of microscopic projections on some of the parts to be sealed biting into microscopic interstices in other parts. It is believed that the present invention is the first to provide a satisfactory leak-proof seal between a substance having the non-resilient characteristics of substances such as Teflon and an article to which it is desired to seal or bond it.

Another polydimethylsiloxane silicone resin, also a product of the General Electric Company, is LTV-602. Unlike RTV-11, however, it does not contain the functional hydroxyl groups. The curing may be effected, under the application of heat, say, between 65° C. to 100° C., with the aid of an amine curing agent. Better results are obtained with the use of an additional adhesive, which is not required in the case of the RTV-11. In the case of other sealing substances, it is similarly desirable otherwise to treat properly the end walls of the plugs 16 and 28, the anode-electrode projection 26 and the crimped inner surfaces of the cathode container 6, in order to render them adherent to predetermined adhesives which are otherwise non-adherent thereto. The effectiveness of some sealing substances, for example, may be increased with the aid of suitable adhesives. Certain silicones that would otherwise not be very effective may thus be rendered capable of use in accordance with the present invention. In the case of other sealing substances, including the before-described RTV-11 silicone, however, the sealing is effective without the aid of additional adhesives.

The invention is not, of course, restricted to use with capacitors. The invention is equally applicable, for example, to the sealing of other containers. Even in the case of capacitors, moreover, the invention is not restricted to those having only a single open end, for the capacitors may, for example, have both ends open, and with both these open ends sealed as above described.

Further modifications will occur to persons skilled in the art, and all such are considered to fall within the spirit and scope of the present invention, as defined in the appended claims.

What is claimed is:

1. A capacitor comprising a container having an open end, an electrolyte in the container and an electrode in the electrolyte having a terminal projecting through said open end, an insulating plug having a peripheral groove, constituted of material chemically non-reactive with the electrolyte, disposed in and closing the open-end of said container, with its peripheral walls fitted into contact with the corresponding inner walls of the container, said plug comprising an opening with said terminal sealingly extending therethrough, the said corresponding inner walls of the container comprising a peripheral bead disposed in said groove and bearing against the peripheral walls defining the groove, said bead and the adjacent peripheral surface defining said groove comprising crevices extending from the inner end to the outer end of said plug, and a flexible polymerized silicone resin chemically non-reactive with the electrolyte disposed between the said peripheral walls of the plug and the said bead of the container and expanded into said crevices, said resin being integrally and permanently joined to the surface of said plug and the adjacent walls of said container including the bead.

2. A capacitor as recited in claim 1 further comprising polymerized silicone resin between the surface defining the opening in said plug and the adjacent surface of said terminal, said resin beng integrally joined to said surface and terminal.

3. A capacitor as recited in claim 1 in which the silicone resin is selected from the group consisting of a polydimethylsiloxane that contains functional hydroxyl groups, the silicone having been cured by promoting cross-linkage of the hydroxyl groups.

4. A capacitor as recited in claim 1 in which the silicone resin is a polydimethylsiloxane that is resistant to the corrosive action of the fluid and that contains hydroxyl groups, the silicone having been cured by promoting cross-linkage of the hydroxyl groups to cause the silicone to expand into the crevices.

References Cited

UNITED STATES PATENTS 2,457,688  12/1948  Kriebel et al. _____ 260—37
2,802,896  8/1957   Tierman et al.
3,056,072  9/1962   Schroeder et al. _____ 317—230

JAMES D. KALLAM, *Primary Examiner*.